US008438710B2

(12) United States Patent
Li

(10) Patent No.: US 8,438,710 B2
(45) Date of Patent: May 14, 2013

(54) METHOD OF MANUFACTURING A STRUCTURE WITH AN INTEGRATED CIRCUIT AND A SILICON CONDENSER MICROPHONE MOUNTED ON A SINGLE SUBSTRATE

(76) Inventor: Gang Li, SuZhou (CN)

( * ) Notice: Subject to any disclaimer, the term of this patent is extended or adjusted under 35 U.S.C. 154(b) by 922 days.

(21) Appl. No.: 12/538,869

(22) Filed: Aug. 11, 2009

(65) Prior Publication Data

US 2011/0038493 A1 Feb. 17, 2011

(51) Int. Cl.
*H01G 7/00* (2006.01)

(52) U.S. Cl.
USPC .......... 29/25.42; 29/592.1; 29/594; 29/609.1; 156/308.2; 156/309.6; 156/309.9; 156/320; 216/62; 216/65; 216/66; 381/174; 381/191; 381/361; 438/3; 438/42; 438/57; 438/98

(58) Field of Classification Search ................. 29/25.42, 29/594, 602.1, 609.1, 876, 877; 381/174, 381/191, 361; 156/308.2, 309.6, 309.9, 320; 216/62, 65, 66; 438/3, 42, 57, 98
See application file for complete search history.

(56) References Cited

U.S. PATENT DOCUMENTS 6,286,369 B1 9/2001 Yazdi et al.
6,943,448 B2 9/2005 Gabriel et al.
7,146,016 B2 12/2006 Pedersen
7,224,812 B2 * 5/2007 Chang ........................... 381/174

FOREIGN PATENT DOCUMENTS

CN 101355827 A 1/2009

* cited by examiner

*Primary Examiner* — Paul D Kim
(74) *Attorney, Agent, or Firm* — Cheng-Ju Chiang

(57) ABSTRACT

A structure with an integrated circuit (IC) and a silicon condenser microphone mounted thereon includes a substrate having a first area and a second area. The IC is fabricated on the first area in order to form a conducting layer and an insulation layer. Both the conducting layer and the insulation layer further extend to the second area. The insulation layer is removed under low temperature in order to expose the conducting layer on which the silicon condenser microphone is fabricated. The silicon condenser microphone includes a first film layer, a connecting layer and a second film layer under a condition that the connecting layer connects the first and the second film layers. The first film layer and the second film layer act as two electrodes of a variable capacitance.

7 Claims, 4 Drawing Sheets

METHOD OF MANUFACTURING A STRUCTURE WITH AN INTEGRATED CIRCUIT AND A SILICON CONDENSER MICROPHONE MOUNTED ON A SINGLE SUBSTRATE

CROSS-REFERENCE TO RELATED APPLICATIONS

This application relates to and is disclosed in Chinese Patent Application No. 200710044322.6, filed on Jul. 27, 2007, and entitled "Integrated Preparation Method for Integrated Circuit and Capacitance Type Micro-Silicon Microphone Single Slice as Well as Chip", naming Gang Li as the inventor who is also the inventor of this instant application. The Chinese Patent Application No. 200710044322.6 was published as Chinese Patent Publication No. CN101355827A on Jan. 28, 2009, but not granted by now. Gang Li is the legal representative of the applicant of Chinese Patent Application No. 200710044322.6, MEMSENSING MICROSYSTEMS CO., LTD.

BACKGROUND OF THE INVENTION

1. Field of the Invention

The present invention relates to a structure with an integrated circuit (IC) and a silicon condenser microphone mounted on a substrate and a method for manufacturing the structure, and more particularly, relates to a structure with an integrated circuit (IC) and a silicon condenser microphone mounted on a same substrate and a method for manufacturing the structure under low temperature.

2. Description of Related Art

Microphone is a transducer for changing sound signals into electronic signals. The traditional silicon condenser microphone typically includes a diaphragm acting as one electrode of a variable capacitance and a back plate acting as the other electrode of the capacitance. With sound signals entering the microphone, the diaphragm is deformed under influence of the sound pressures of the sound signals, which changes the capacitance between the diaphragm and the back plate. As a result, the change of the capacitance is transformed into the electronic signals by the following processing circuits.

The silicon condenser microphone has been in a research and development stage for more than 20 years. Because of its potential advantages in miniaturization, performance, reliability, environmental endurance, low cost, and mass production capability, the silicon condenser microphone is widely recognized as the next generation product to replace the conventional electrets condenser microphone (ECM) that has been widely used in communication, multimedia, consumer electronics, hearing aids, and so on. The ECM has stored charge either in its back plate or diaphragm. However, such stored charge is easily leaked under high temperatures up to 260 degrees during automotive assembly.

Unlike the ECM, the silicon condenser microphone depends on the external bias voltage to pump the required charge into its variable capacitor. As a result, the silicon condenser microphone can't worry about the leaking of the stored charge. The silicon condenser microphone can endure high temperatures during surface mountable installation so that it can be automatically assembled on the corresponding PCB instead of hand installation.

Nowadays, there are two general types of integration methods for fabricating a MEMS component and an IC. One method is called multiple substrate integration among which the MEMS component and the IC are individually fabricated on different substrates by different companies. Thereafter, the MEMS component and the IC are packaged into a functional unit. The advantages of this method are that the design and manufacture of MEMS component can be solely optimized with low cost. The other method is called single substrate integration among which the MEMS component and the IC are fabricated on the same substrate. Such method is normally used for manufacturing high output impedance sensor or capacitive sensor in order to improve their integral performance and decrease influence of the outside noise interference.

There are three kinds of methods of single substrate integration. The first method is to fabricate the MEMS component first and then finish the fabrication of the IC on a same single substrate. The second method is interlaced fabricate the MEMS component and the IC are on the same single substrate. The third method is to fabricate the IC through standard semiconductor processing and then to fabricated the MEMS component on the same substrate. However, the IC manufactured by the first and the second methods is easily polluted by the prior MEMS component. Regarding to the third method, after the IC is fabricated on the substrate, high temperature must be avoided in the following steps for fabricating the MEMS component because the metal electrodes of the IC cannot endure high temperatures over 400 degrees.

Hence, it is desired to have an improved structure with an integrated circuit (IC) and a silicon condenser microphone mounted on a single substrate and a method for manufacturing the structure with low temperature solving the problems above.

BRIEF SUMMARY OF THE INVENTION

A structure with an integrated circuit (IC) and a silicon condenser microphone mounted thereon includes a substrate having a first area and a second area both formed on a first surface of the substrate. The IC is fabricated on the first area in order to form a conducting layer and an insulation layer covering the conducting layer. Both the conducting layer and the insulation layer further extend to the second area. The silicon condenser microphone is fabricated on the conducting layer located at the second area. The silicon condenser microphone includes a first film layer, a connecting layer formed on the first film layer, a second film layer formed on the connecting layer under a condition that the connecting layer connects the first and the second film layers. The first film layer and the second film layer act as two electrodes of a variable capacitance. The first or the second film layer forms a back plate through which a plurality of ventilation holes is defined. A back chamber is defined through a second surface of the substrate opposite to the first surface under a condition that the back chamber communicates with the insulation layer located at the second area.

A method for manufacturing a structure with an integrated circuit (IC) and a silicon condenser microphone mounted on a same substrate comprising steps of: a) providing the substrate having a first area for fabricating the IC and a second area for fabricating the silicon condenser microphone under a condition that both the IC and the silicon condenser microphone are fabricated on a first surface of the substrate; b) fabricating the IC on the first area via standard semiconductor batch processing techniques in order to form a conducting layer and an insulation layer covering the conducting layer, both the conducting layer and the insulation layer further extending to the second area; c) removing the insulation layer located at the second area in order to expose the conducting layer; d) fabricating a first film layer on the conducting layer which is located at the second area via low-temperature techniques under 400 degrees, the first film layer together with the conducting layer located at the second area forming a combination acting as one electrode of a variable capacitance; e) fabricating a sacrificial layer on the first film layer via low-temperature techniques; f) fabricating a back plate on the sacrificial layer via low-temperature techniques, the conductive back plate electrically connecting the combination and acting as the other electrode of the variable capacitance; g) defining a plurality of ventilation holes through the back plate via lithography and etching processes; h) irrigating a kind of etching solution into the sacrificial layer through the ventilation holes in order to partly etch the sacrificial layer and form a plurality of air gaps between the first film layer and the back plate; and i) defining a back chamber through a second surface of the substrate opposite to the first surface via lithography and etching processes under a condition that the back chamber is corresponding to the second area.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE PREFERRED EMBODIMENT

In the following description, numerous specific details are set forth to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

Please refer to FIGS. 1-8, a method for manufacturing a structure with an integrated circuit (IC) and a silicon condenser microphone according to a first embodiment of the present invention is disclosed including the following steps.

Figure 1:
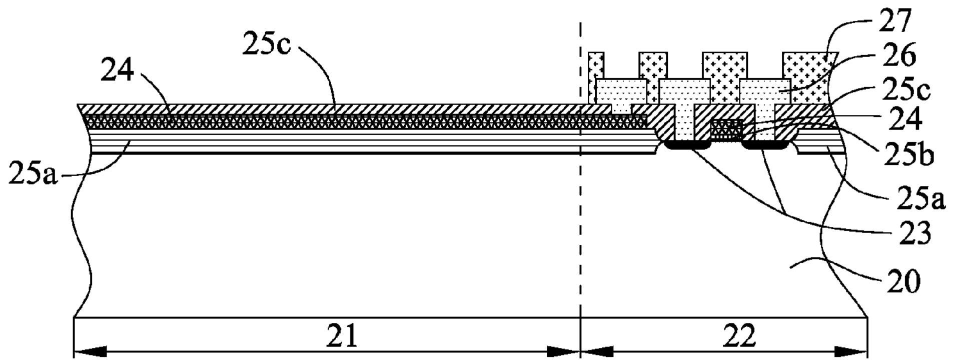
FIGS. 1 to 7 are schematic cross-sectional views showing steps for manufacturing a structure according to a first embodiment of the present invention.

Please refer to FIG. 1, firstly, a single substrate 20 is provided with a first area 22 for fabricating the IC and a second area 21 for fabricating the silicon condenser microphone which is adapted for mating with the IC. The IC and the silicon condenser microphone are mainly formed on a top surface 201 of the substrate 20.

Secondly, the IC is fabricated on the top surface 201 of the first area 22 via standard semiconductor batch processing techniques in order to form a gate conducting layer 24 and an insulation layer 25*c* covering the conducting layer 24. The IC can be a Filed Effect Transistor (FET) or a resistance or a capacitor or the like. Take a Metal Oxide Semiconductor Field Effect Transistor (MOSFET) for example in order to simplify description of the IC, the MOSFET component includes an oxide layer 25*a*, a gate oxide layer 25*b*, a source/drain dopant area 23, the conducting layer 24, the insulation layer 25*c*, a metal conductive layer 26 and a passivation layer 27 etc. The oxide layer 25*a*, the conducting layer 24 formed on the oxide layer 25*a,* and the insulation layer 25*c* grown on the conducting layer 24 all further extend to the second area 21.

Figure 2:
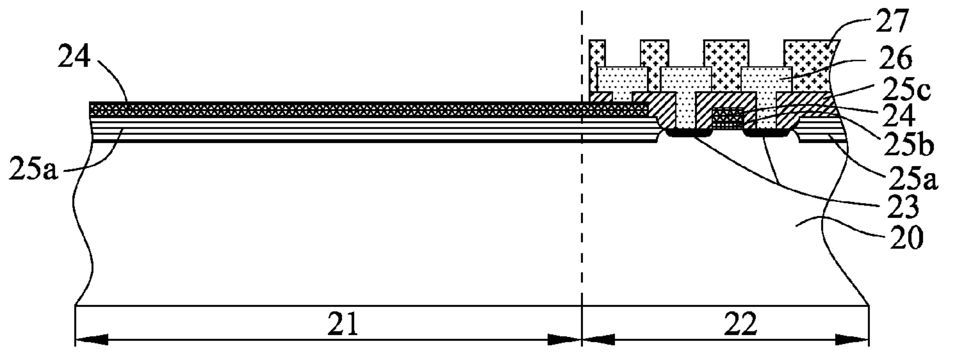

Thirdly, referring to FIG. 2, the insulation layer 25*c* located at the second area 21 is removed to expose the conducting layer 24. The insulation layer 25*c* can be made of oxidized silicon and the conducting layer 24 can be formed of polycrystalline silicon or silicate.

Figure 3:
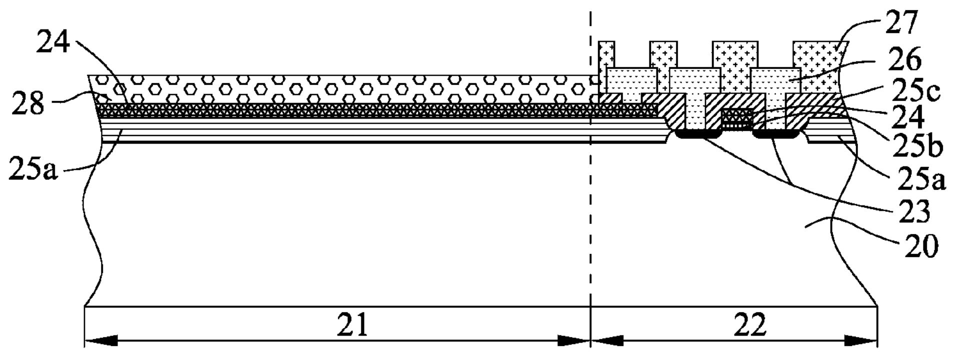

Fourthly, referring to FIG. 3, a first film layer 28 is then fabricated on the conducting layer 24 which is located at the second area 21 via low-temperature under 400 degrees. The first film layer 28 is also called a diaphragm or a sound-sensitive film. The first film layer 28 together with the conducting layer 24 located at the second area 21 forms a combination acting a one electrode of a variable capacitance. The first film layer 28 is a single film or a composite film. The first film layer 28 can be made of one material of silicon dioxide, silicon nitride and amorphous silicon materials via Physical Vapor Deposition (PVD) such as sputtering or evaporation. Besides, the first film layer 28 can be made of one material of silicon dioxide, silicon nitride and amorphous silicon materials via Chemical Vapor Deposition (CVD) such as Plasma Enhanced Chemical Vapor Deposition (PECVD) or Low Pressure Chemical Vapor Deposition (LPCVD). Furthermore, the first film layer 28 can be made of poly-p-xylene material via low-pressure chemical vapor deposition. Moreover, the first film layer 28 can be made of an organic substance material layer such as polyimide via spin coating or spray coating.

Figure 4:
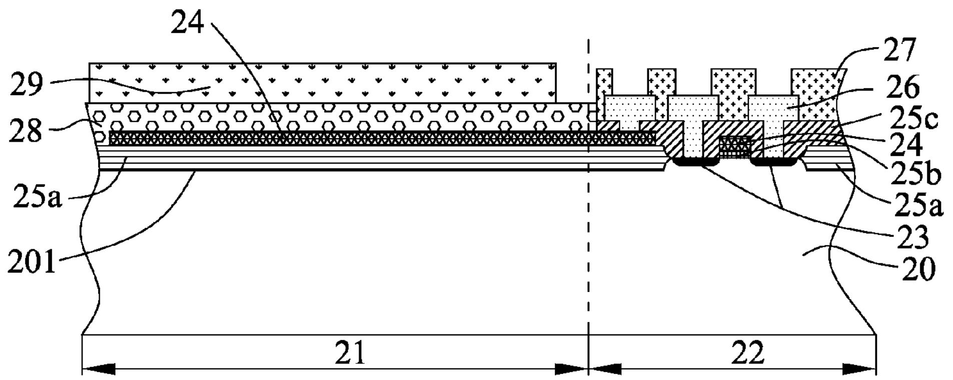

Fifthly, referring to FIG. 4, a sacrificial layer 29 is then fabricated on the first film layer 28 via low-temperature techniques. The sacrificial layer 29 can be made of one material of silicon dioxide, metal, photoresist and polyimide etc. Figures of the sacrificial layer 29 can be obtained through photolithography and wet etching processes.

Figure 5:
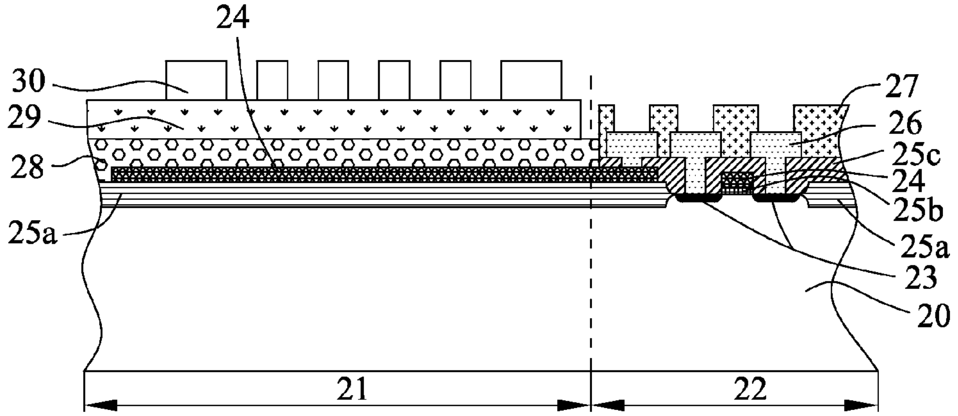

Sixthly, referring to FIG. 5, a conductive back plate 30 is then formed on the sacrificial 29 via low-temperature techniques so that the conductive back plate 30 electrically connects the first film layer 28 and act as the other electrode of the variable capacitance. The back plate 30 is a composite layer formed by a metal layer and a medium material wherein the medium material is formed by one method of physical vapor deposition, chemical plating and electroplating, etc.

Figure 8:
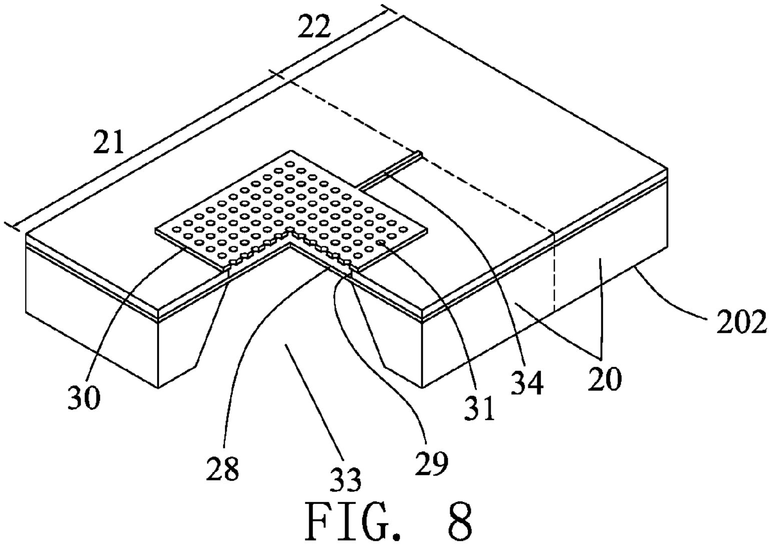
FIG. 8 is a perspective view of the structure with an integrated circuit (IC) and a silicon condenser microphone mounted on a same single substrate.

Seventhly, as shown in FIG. 8, a plurality of ventilation holes 31 are defined through the back plate 30 via lithography and etching processes. Simultaneously, a plurality of conductive traces 34 are formed to electrically connect the IC and the silicon condenser microphone.

Figure 6:
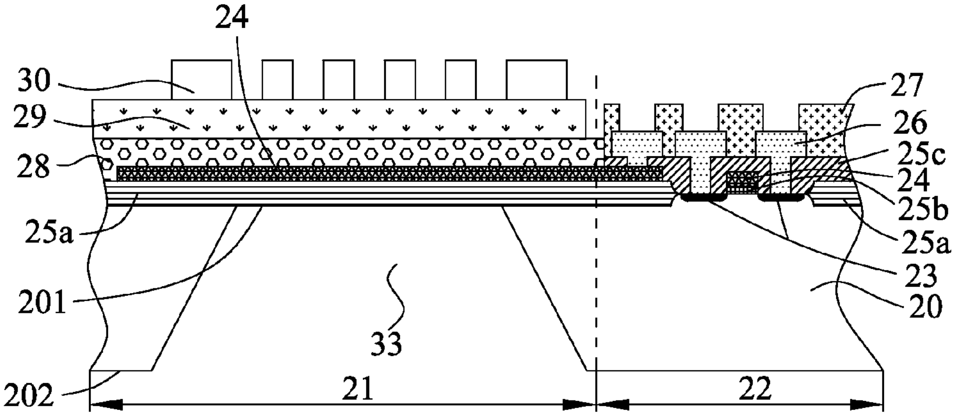

Eighthly, as shown in FIG. 6, a back chamber 33 is then defined through a bottom surface 202 of the substrate 20 opposite to the top surface 201 via lithography and etching process. The back chamber 33 is arranged to further extend towards and communicate with the oxide layer 25*a* located at the second area 21. The back chamber 33 is formed by application of wet etching process using a kind of anisotropic etching solution which is one of the potassium hydroxide solution and tetramethylammonium hydroxide solution. Alternatively, the back chamber 33 can be fabricated by a dry etching technique of Deep Reactive Ion Etching (DRIE).

Figure 7:
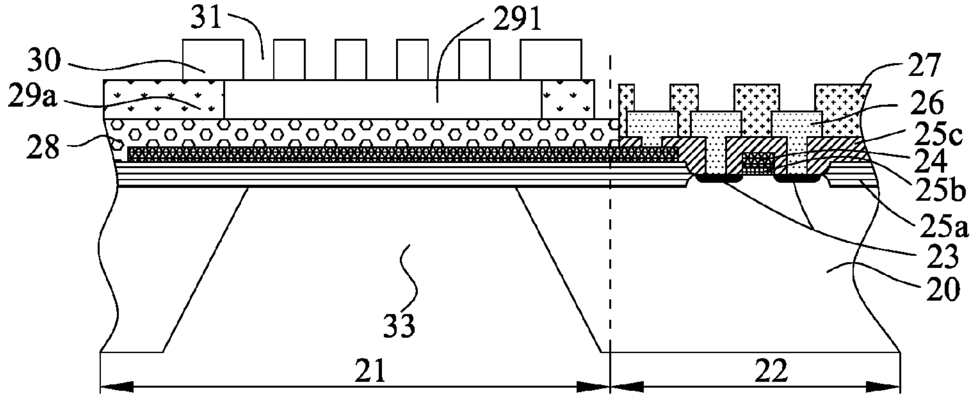

Ninthly, as shown in FIG. 7, another kind of etching solution is irrigated into the sacrificial layer 29 through the ventilation holes 31 in order to partly etch the sacrificial layer 29 and form a plurality of air gaps 291 between the first film layer 28 and the back plate 30. The sacrificial layer 29 is made of one material of silicon dioxide, metal, photoresist and polyimide organic substance. Accordingly, when the sacrificial layer 29 is made of metal or photoresist, a wet etching technique can be applied to etch the sacrificial layer 29. Alternatively, when the sacrificial layer 29 is formed by silicon dioxide or polyimide organic substance, dry etching technique is selected to be applied to etch the sacrificial layer 29. Remain portions 29*a* of the sacrificial layer 29 after etching processes connect the first film layer 28 and the back plate 30. The remain portions 29*a* can be continuously located at circumference of the first film layer 28. However, in other embodiments, the remain portions 29*a* can be dispersedly located at one point or multiple points of the first film layer 28, or can be located at a central portion of the first film layer 28.

Besides, the steps of manufacturing the structure can be selective to define a plurality of trenches through the first film layer 28 based on the actual needs. It is obvious to those of ordinary skill in the art to realize that the steps for etching the sacrificial layer 29 and fabricating the back chamber 33 can be transposed.

Referring to FIG. 8, the structure manufactured by the above method includes the first area 22 with the IC formed thereon and the second area 21 with the silicon condenser microphone fabricated thereon. A condenser sensor area of the structure includes the sound-sensitive film 28, the remain portions 29*a* formed on the sound-sensitive film 28, the back plate 30 formed on the remain portions 29*a*, the back cavity 33 defined through the bottom surface 202 of the substrate 20, and the plurality of ventilation holes 31 defined through the back plate 30. The remain portions 29*a* are formed by etching the sacrificial layer 29 and the remain portions 29*a* can be continuously located at the circumference of the sound-sensitive film 28 so that the circumference of the sound-sensitive film 28 can be electrically connected with the back plate 30 via the remain portions 29*a*. Besides, the remain portions 29*a* can be dispersedly located at part of the sound-sensitive film 28 so that one point or multiple points of the sound-sensitive film 28 can be electrically connected with the back plate 30 via the remain portions 29*a*. Moreover, the remain portions 29*a* can be located at a center portion of the sound-sensitive film 28 so that the center portion of the sound-sensitive film 28 can be electrically connected with the back plate 30 via the remain portions 29*a*.

Figure 9:
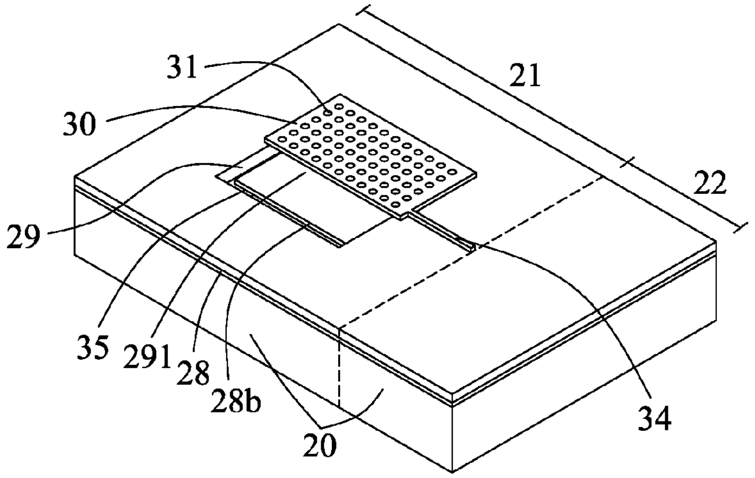
FIG. 9 is a schematic perspective view of another structure according to a second embodiment of the present invention.
Figure 10:
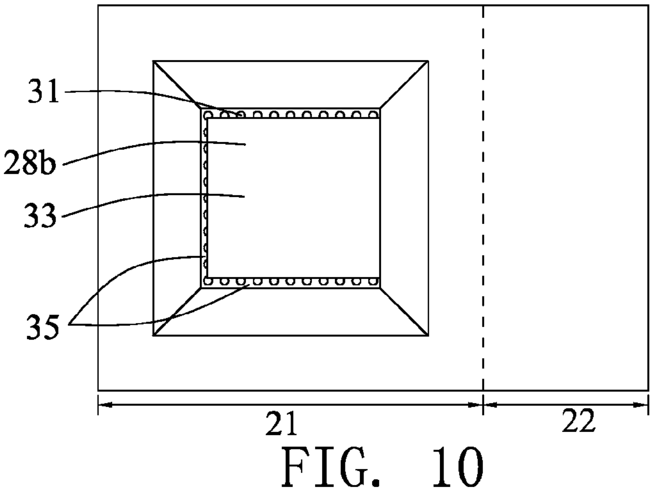
FIG. 10 is a bottom view of the structure shown in FIG. 9.

Referring to FIGS. 9 and 10, according to a second embodiment of the present invention, a sound-sensitive film 28*b* of the structure is cantilevered with one side of the sound-sensitive film 28*b* connecting with the back plate 30 through the remain portions 29*a* while other sides of the sound-sensitive film 28*b* are suspended. Such sound-sensitive film 28*b* has advantages of high sensitivity and insensitivity to residual stresses with respect to the sound-sensitive film 28 shown in FIG. 8 with its all sides connecting with the back plate 30. Besides, under the same level of sensitivity, the sound-sensitive film 28*b* can be provided with lower profile and cost with respect to the sound-sensitive film 28. Moreover, a slit 35 can be defined through the sound-sensitive film 28*b* in order to improve the capability of the sound-sensitive film 28*b*.

Figure 11:
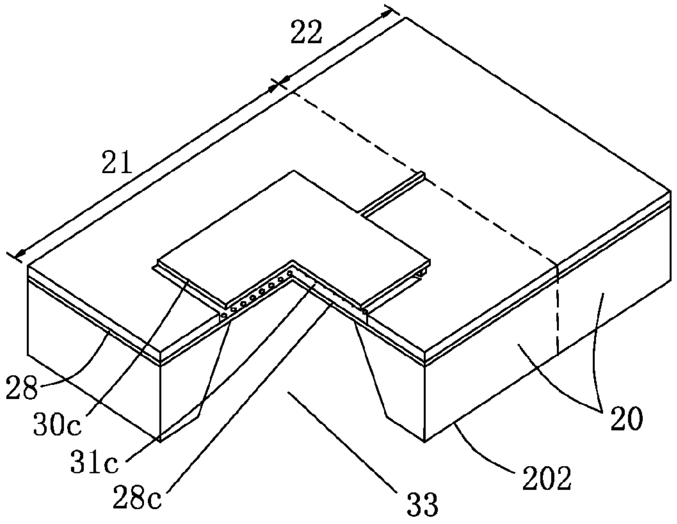
FIG. 11 is a perspective view of a structure according to a third embodiment of the present invention.
Figure 12:
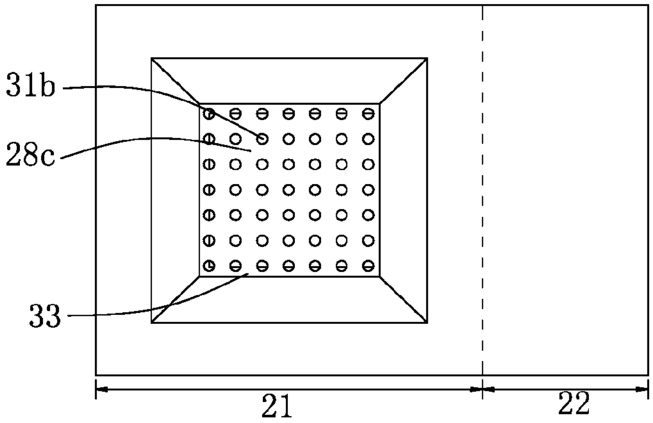
FIG. 12 is a bottom view of the structure shown in FIG. 11.

Referring to FIGS. 11 and 12, another method for manufacturing the structure according to a third embodiment of the present invention is disclosed. The method is similar to the method disclosed in the first embodiment, among which the initial three steps of the method according to the third embodiment are the same as that of the first embodiment. So, detailed description of the initial three steps are omitted herein. However, following steps after the third step are different which will be detailed hereinafter.

After the third step, the first film layer 28 is then fabricated on the conducting layer 24 which is located at the second area 21 via low-temperature techniques under 400 degrees. The first film layer 28 together with the conducting layer 24 located at the second area 21 form a back plate 28*c* acting as one electrode of a variable capacitance. Then, a plurality of ventilation holes 31*b* are defined through the back plate 28*c* via lithography and etching processes. Then, a sacrificial layer is fabricated on the first film layer 28 via low-temperature techniques. Then, a sound-sensitive film 30*c* is formed on the sacrificial layer via low-temperature techniques under a condition that the sound-sensitive film 30*c* electrically connects the back plate 28*c* and acts as the other electrode of the variable capacitance. Thereafter, the back chamber 33 is defined through the bottom surface 202 of the substrate 20 via lithography and etching process under a condition that the back chamber 33 is corresponding to the second area 21. Finally, a kind of etching solution is irrigated into the sacrificial layer through the ventilation holes 31*b* in order to partly etch the sacrificial layer and form a plurality of air gaps 31*c* between the sound-sensitive film 30*c* and the back plate 28*c*. The air gaps 31*c* are adapted for releasing pressure of the sound-sensitive film 30*c*.

The remain portions of the sacrificial layer after etching processes can be arranged similar to the first embodiment. So, detailed description of the remain portions and relationships thereof according to the third embodiment are omitted herein.

Besides, similar to the first embodiment, the steps for manufacturing the structure according to the third embodiment can be selective to define a plurality of slits through the sound-sensitive film 30*c* based on the actual needs in order to improve capability of the structure.

The structures according to the first and third embodiments of the present invention are both fabricated on the single substrate 20. The main differences between them are that the sound-sensitive film 28 disclosed in the first embodiment is located between the back chamber 33 and the back plate as best shown in FIG. 7 while the sound-sensitive film 30*c* shown in the third embodiment is located above the back plate 28*c* as best shown in FIG. 11.

While specific embodiments have been illustrated and described, numerous modifications come to mind without significantly departing from the spirit of the invention, and the scope of protection is only limited by the scope of the accompanying claims.

I claim:

1. A method for manufacturing a structure with an integrated circuit (IC) and a silicon condenser microphone mounted on a same substrate comprising steps of:

a) providing the substrate having a first area for fabricating the IC and a second area for fabricating the silicon condenser microphone under a condition that both the IC and the silicon condenser microphone are fabricated on a first surface of the substrate;

b) fabricating the IC on the first area via standard semiconductor batch processing techniques in order to form a conducting layer and an insulation layer covering the conducting layer, both the conducting layer and the insulation layer further extending to the second area;

c) removing the insulation layer located at the second area in order to expose the conducting layer;

d) fabricating a first film layer on the conducting layer which is located at the second area via low-temperature techniques under 400 degrees, the first film layer together with the conducting layer located at the second area forming a combination acting as one electrode of a variable capacitance;

e) fabricating a sacrificial layer on the first film layer via low-temperature techniques;

f) fabricating a back plate on the sacrificial layer via low-temperature techniques, the conductive back plate electrically connecting the combination and acting as the other electrode of the variable capacitance;

g) defining a plurality of ventilation holes through the back plate via lithography and etching processes;

h) irrigating an etching solution into the sacrificial layer through the ventilation holes in order to partly etch the sacrificial layer and form a plurality of air gaps between the first film layer and the back plate; and i) defining a back chamber through a second surface of the substrate opposite to the first surface via lithography and etching processes under a condition that the back chamber is corresponding to the second area.

2. The method for manufacturing the structure as claimed in claim 1, wherein the back chamber is formed by application of wet etching process using another anisotropic etching solution which is one of the potassium hydroxide solution and tetramethylammonium hydroxide solution, or the back chamber can be fabricated by a dry etching technique of Deep Reactive Ion Etching (DRIE).

3. The method for manufacturing the structure as claimed in claim 1, wherein steps h) and i) can be transposed.

4. The method for manufacturing the structure as claimed in claim 1, further comprising a step of defining at least one trench through the first film layer in order to improve high sensitivity of the first film layer.

5. The method for manufacturing the structure as claimed in claim 1, wherein the first film layer is a single film or a composite film, and the first film layer can be formed by one material selected from the group consisting of silicon dioxide, silicon nitride and amorphous silicon materials via physical or chemical vapor deposition, or the first film layer can be formed by a poly-p-xylene material layer via low-pressure chemical vapor deposition, or the first film layer can be formed by an organic substance material layer via spin coating or spray coating.

6. The method for manufacturing the structure as claimed in claim 1, wherein the back plate is a composite layer formed by a metal layer and a medium material, and wherein the medium material is formed by one method of physical vapor deposition, chemical plating and electroplating.

7. The method for manufacturing the structure as claimed in claim 1, wherein the sacrificial layer is formed by one material selected from the group consisting of silicon dioxide, metal, photoresist and polyimide organic substance, and wherein a wet etching technique is applied to etch the sacrificial layer when the sacrificial layer is formed by metal or photoresist, or a selective dry etching technique is applied to etch the sacrificial layer when the sacrificial layer is formed by silicon dioxide or polyimide organic substance.

* * * * *